US008196757B2

(12) United States Patent
Dremov et al.

(10) Patent No.: US 8,196,757 B2
(45) Date of Patent: Jun. 12, 2012

(54) UNIT FOR INTEGRATED WASTE WATER BIOLOGICAL TREATMENT

(76) Inventors: Oleg Vladimirovich Dremov, Moskovskaya obl. (RU); Dmitry Stanislavovich Bushev, Moscow (RU)

( * ) Notice: Subject to any disclaimer, the term of this patent is extended or adjusted under 35 U.S.C. 154(b) by 406 days.

(21) Appl. No.: 12/457,952

(22) Filed: Jun. 25, 2009

(65) Prior Publication Data
US 2010/0006486 A1    Jan. 14, 2010

(30) Foreign Application Priority Data
Jun. 26, 2008 (RU) ................................ 2008125987

(51) Int. Cl.
*C02F 3/00* (2006.01)
(52) U.S. Cl. .................................................. 210/532.2
(58) Field of Classification Search ................ 210/532.2
See application file for complete search history.

(56) References Cited

U.S. PATENT DOCUMENTS

| 2,553,885 | A | * | 5/1951 | Orman et al. | 210/232 |
| 2,671,573 | A | * | 3/1954 | Hendon et al. | 220/4.16 |
| 3,136,024 | A | * | 6/1964 | La Monica | 249/66.1 |
| 3,240,343 | A | * | 3/1966 | Werner | 210/256 |
| 4,709,723 | A | * | 12/1987 | Sidaway et al. | 137/584 |
| 6,183,631 | B1 | * | 2/2001 | Cormier et al. | 210/91 |
| 2008/0053885 | A1 | * | 3/2008 | Graf | 210/232 |

FOREIGN PATENT DOCUMENTS

JP        10-5695    *  1/1998

* cited by examiner

*Primary Examiner* — Chester Barry
(74) *Attorney, Agent, or Firm* — The Nath Law Group; Jerald L. Meyer; Stanley N. Protigal

(57) ABSTRACT

Biological treatment with the small-bubble aeration (air artificial supply) for oxidizing waste water components in a unit for integrated waste water biological treatment includes a reservoir with a waste water receiving chamber, an aerotank chamber, a secondary settling tank and an activated sludge stabilizer. The receiving chamber is communicated through an air-lift to the aerotank chamber and includes a primary filter and a device for blowing off the filter, float-type level guages and an air-lift for transferring waste water, an air-lift for transferring a grease film into the aerotank chamber. The receiving chamber, the aerotank chamber and the activated sludge sterilizer are provided with aerators. The aerotank chamber and the secondary settling tank is supplied from at least two compressors, the chamber of the activated sludge stabilizer is provided with an intermediate partition forming an additional chamber for stabilizing sludge.

5 Claims, 3 Drawing Sheets

UNIT FOR INTEGRATED WASTE WATER BIOLOGICAL TREATMENT

This invention relates to units combining biological treatment with the small-bubble aeration (air artificial supply) process for oxidizing waste water components. It is intended for integrated waste water biological treatment.

A unit for waste water treatment by a biological process is known from RF Patent No. 2162062, C02F 3/00, 1995, which comprises an equalizing tank with waste water supply and a raw water air-lift for supplying it from the equalizing tank to an activation tank including an air supply and a tap to a secondary settling tank, the tap being provided with a sludge removal air-lift for air-lifting sludge from the secondary settling tank to the activation tank, and a discharge opening, wherein a float switch for minimum and work levels of waste water is arranged in the activation tank and is intended for terminating the activation process and switching on the air-lift for removing sludge from the activation tank to the equalizing tank or switching off the sludge removal air-lift and resuming the activation process when the waste water work level is achieved in the equalizing tank.

Disadvantages of this unit include low productivity and insufficiently good treatment quality.

A unit for household sewage biological treatment is known from RF Patent No. 45380, C02F 3/00, 2005, which comprises process chambers, including an equalizing chamber and an activation chamber, level guages, an aeration system for direct and reverse treatment modes, having at least two compressors connected to air-lifts and aerators arranged in the process chambers, which is connected to a control unit capable of switching between the direct treatment mode and the reverse treatment mode, wherein the unit is also provided with an emergency discharge system composed of an emergency level guage installed in the equalizing chamber and an emergency discharge air-lift connected to an emergency air-lift. Furthermore, the unit is provided with a secondary settling tank and a sludge stabilization chamber.

This conventional unit is taken as the closest analogous solution.

Its disadvantages include insufficiently good treatment quality, a complex and expensive control system and a complicated design of the unit itself.

The technical objective of the disclosure is to develop and provide a unit for integrated waste water biological treatment, which has a simple in operation and compact design, high reliability, long service life and is environmentally safe.

Also, this is the technical effect including high treatment quality of any volumes of waste water supplied to the unit, especially in cases of so-called volleys or surge inflows having peak volumes.

The stated technical objective is achieved due to the fact that the proposed unit is a reservoir comprising a housing, a waste water receiving chamber, an aerotank chamber, a secondary settling tank with discharge of treated water and an activated sludge stabilizer, which are all arranged in the said housing, the receiving chamber includes a primary filter and a means for blowing it off, float-type level guages and an air-lift for transferring waste water, an air-lift for transferring a grease film into the aerotank chamber, wherein the receiving chamber, the aerotank chamber and the activated sludge sterilizer are provided with aerators air to which as well as to air-lifts arranged in the receiving chamber, the aerotank chamber and the secondary settling tank is supplied from at least two compressors, the chamber of the activated sludge stabilizer is provided with an intermediate partition forming an additional chamber for stabilizing sludge, this partition being composed of two parts, the upper one and the lower one, which are arranged so as to form free space between them, wherein the upper part is arranged obliquely and the lower part is arranged vertically, and an air-lift for transferring surge inflows is arranged in the receiving chamber.

The disclosed system is shown in the appended drawings where:

Figure 3:
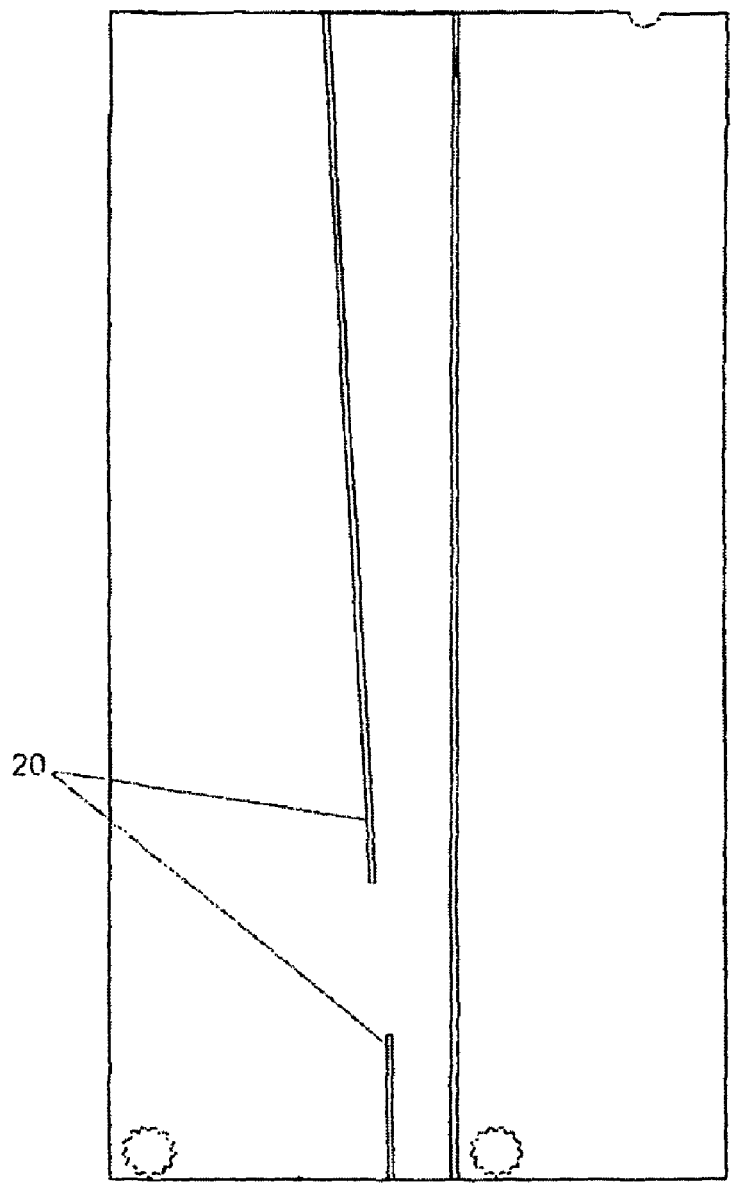

FIG. 3 schematically shows the intermediate partition arranged in the activated sludge stabilizer.

The unit for integrated waste water treatment comprises a reservoir 1 having a rectangular all-bearing housing provided with stiffening ribs (not shown in the drawings). The housing walls are made of foamed polypropylene.

The housing is subdivided into the work chambers, namely: the receiving chamber 2 with waste water supply where primary treatment for removing large fractions is carried out; the aerotank chamber 3 being the main treatment chamber where intensive oxidation of waste water without large fractions and slight oxidation by activated sludge takes place; the secondary settling tank 4 where working activated sludge is separated from pure water; and the activated sludge stabilizer 5 (i.e., the chamber where spent activated sludge is accumulated).

Figure 1:
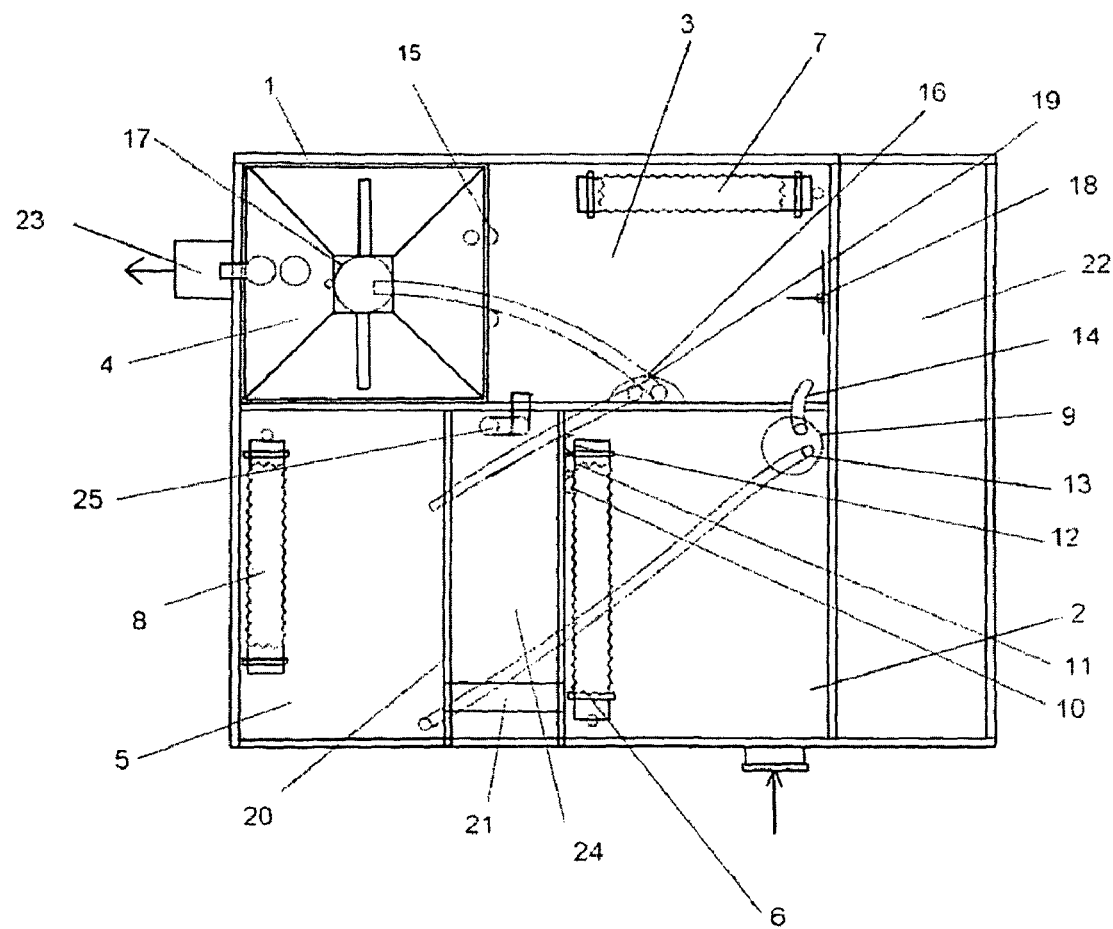
FIG. 1 is a plan view of the unit.
Figure 2:
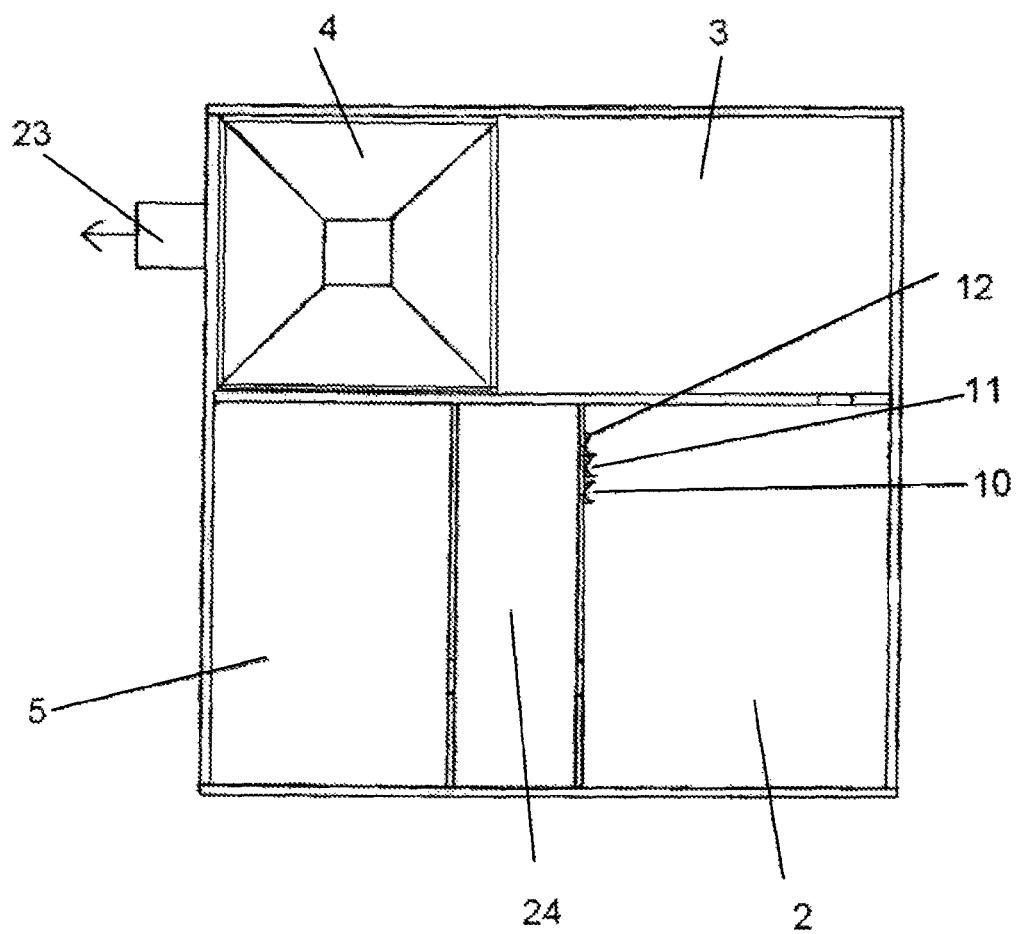
FIG. 2 is a plan view of the unit, showing the main chambers.

An aerator 6 and a primary filter 9 as well as a means (not shown in FIG. 1) for blowing the filter off are arranged in the receiving chamber 2. This chamber is also provided with float guages 10, 11 for the work level and the emergency level, respectively, as well as a float guage 12 for a surge inflow level. The receiving chamber 2 also has an air-lift 13 for transferring surge inflows and is communicated with the aerotank chamber through an air-lift 14 for transferring waste water. The aerotank chamber is provided with an aerator 7 and a fibrous material remover 18.

The unit also comprises an aerator 8, air-lifts 15 for transferring grease films, air-lifts 19 for transferring sludge and a circulation air-lift 16, which are all arranged in the respective chambers and form, together with the aerators and the float guages, two aeration subsystems (for the direct treatment mode and the reverse treatment mode), each of the subsystems is provided with a compressor. These devices are controlled by an electric-pneumatic distribution cabinet 22.

The disclosed system can be operated as follows.

Waste water is fed as a gravity flow to the receiving chamber 2 where large fractions are broken down by intensive aeration. There the organic portion of waste water is separated from the non-organic portion and activated sludge slightly acts on waste water, solid and non-degradable particles settle into the chamber bottom part where passive sediment is formed in the result of contacting mineral sediment. Then, small fractions go through the primary filter 9 and are transferred by the air-lift 14 to the aerotank chamber 3.

The latter chamber is used for intensively acting by activated sludge on waste water and biologically treating it. Then, after treatment, a mixture of water and sludge is transferred to the secondary settling tank 4 where activated sludge is separated from water by gravity in the tranquil state and in non-aerated space of the stabilizing cylinder 17, sludge passes to the bottom part of the secondary settling tank, and water goes to the outlet tube 23 through an additional filter (not shown on the drawings).

At that time a grease film, which is formed in the secondary settling tank 4, is transferred by the air-lift 15 back into the aerotank chamber 3. Activated sludge is transferred by the air-lift from the bottom part of the unit to the activated sludge stabilizer 5, where the old (heavier) activated sludge is separated from the new (lighter) activated sludge. The new sludge flows into the receiving chamber and from there back into the aerotank chamber.

The activated sludge stabilizer is divided by an intermediate partition 20 consisting of two, the upper one and the lower one, parts (FIG. 3) arranged so as to form free space between them, the upper part being arranged obliquely, and the lower part being arranged vertically. By using this partition an additional chamber 24 is formed, which communicates through an overflow device 21 (FIG. 1) with both the main chamber of the sludge stabilizer 5 and the receiving chamber 2; this additional chamber 24 constantly contains treated water in its upper part, and the presence of the partition enables to preclude washing activated sludge out of the chamber during the operation of the unit process equipment.

Thus, the unit continuous operation mode is ensured owing to what waste water can be cleaned by 98%.

Spent activated sludge is removed by an air-lift once in three or four months.

At insufficient quantities of waste water, when its level in the receiving chamber 2 reaches a preset minimum, the float guage 10 switches on the compressor of the reverse mode aeration subsystem and toggles the unit into the recycling mode (reverse mode). During operation in this mode the receiving chamber is aerated, and sludge is transferred by the air-lift 19 from the aerotank chamber 3 into the activated sludge stabilizer 5 where activated sludge is separated into fractions, the most active lighter sludge is transferred together with the remaining water back into the receiving chamber, and heavier sludge settles into the bottom part of the stabilizer. After the level of a liquid in the receiving chamber reaches the work upper value, the float guage 11 switches on the compressor of the direct mode aeration subsystem, and the unit starts working in the mode of liquid direct flow.

If surge inflows with peak values of waste water come to the unit, the float guage 12 switches on the surge inflow air-lift 13, and simultaneously the overflow air-lift 25, which is arranged in the additional chamber 24 of the activated sludge stabilizer 5, starts operating. Treated water from the upper part of the chamber 24 is transferred into the aerotank chamber 3 and from there into the secondary settling tank 4.

After treating any surge inflows the air-lift 13 turns off, and the unit passes to the above-described recirculation mode.

Thus, during operating the unit activated sludge is removed automatically and its concentration is maintained at a level necessary for optimal treatment, including a case of overfilling the unit above the emergency level and a case of surge inflows.

What is claimed is:

1. A unit for integrated waste water biological treatment, comprising:
   a reservoir accommodating a receiving chamber, the receiving chamber having a waste water supply, an air-lift for transferring surge inflows, an air-lift for transferring waste water, a primary filter and a means for clearing the primary filter, and float gauges for measuring a level of waste water;
   an aerobic tank chamber, the aerobic tank chamber having an air-lift for transferring sludge, the aerobic tank chamber in fluid communication with the receiving chamber by means of the air-lift;
   a secondary settling tank, the secondary settling tank having an outlet tube for discharging treated water and an air-lift for transferring a grease film into the aerobic tank chamber;
   an activated sludge stabilizer chamber, the activated sludge stabilizer chamber having an intermediate partition forming an additional chamber for stabilizing sludge, the intermediate partition composed of an upper part and a lower part so as to form free space between said parts, the lower part being arranged below the upper part and upright to the bottom of the activated sludge stabilizer chamber, and the upper part being arranged obliquely with respect to the lower part;
   aerators provided in the receiving chamber, the aerobic tank chamber and the activated sludge stabilizer chamber, respectively; and
   a source of compressed air for supplying air to the aerators and to the air-lifts.

2. The unit according to claim 1, characterized in that the reservoir is provided with stiffening ribs.

3. The unit according to claim 1, characterized in that the reservoir has a rectangular cross-section.

4. The unit according to claim 1, characterized in that the reservoir is made of polypropylene.

5. The unit according to claim 1, characterized in that the source of compressed air comprises at least two compressors for supplying air to the aerators and to the air-lifts.

\* \* \* \* \*